US011087659B2

(12) United States Patent
Stroffolino et al.

(10) Patent No.: US 11,087,659 B2
(45) Date of Patent: Aug. 10, 2021

(54) SYSTEM, METHOD AND DEVICE FOR PRESENTING DIFFERENT FUNCTIONAL DISPLAYS WHEN ORIENTATION OF THE DEVICE CHANGES

(75) Inventors: Philip John Stroffolino, Atlanta, GA (US); Terry Douglas Lee, Lawrenceville, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 421 days.

(21) Appl. No.: 13/046,131

(22) Filed: Mar. 11, 2011

(65) Prior Publication Data
US 2012/0229370 A1    Sep. 13, 2012

(51) Int. Cl.
| | |
|---|---|
| G09G 3/20 | (2006.01) |
| H04N 21/431 | (2011.01) |
| H04N 21/422 | (2011.01) |
| H04N 21/41 | (2011.01) |
| H04N 21/482 | (2011.01) |
| G06F 3/0346 | (2013.01) |
| G09G 5/22 | (2006.01) |

(52) U.S. Cl.
CPC ............ *G09G 3/20* (2013.01); *G06F 3/0346* (2013.01); *H04N 21/4126* (2013.01); *H04N 21/42202* (2013.01); *H04N 21/42209* (2013.01); *H04N 21/42222* (2013.01); *H04N 21/4314* (2013.01); *H04N 21/4821* (2013.01); *G06F 2200/1614* (2013.01); *G06F 2200/1637* (2013.01); *G09G 5/22* (2013.01); *G09G 2340/0492* (2013.01)

(58) Field of Classification Search
None
See application file for complete search history.

(56) References Cited

U.S. PATENT DOCUMENTS

| | | | |
|---|---|---|---|
| 8,769,578 B2* | 7/2014 | Lau | H04N 21/485 725/42 |
| 9,075,523 B2* | 7/2015 | Stallings | H04N 21/42208 |
| 9,118,869 B2* | 8/2015 | Stallings | H04N 21/4821 |
| 9,201,627 B2* | 12/2015 | Tam | H04N 21/4126 |
| 9,380,331 B2* | 6/2016 | Roberts | G06F 3/0484 |
| 2008/0049142 A1* | 2/2008 | Schohn et al. | 348/569 |
| 2008/0259094 A1* | 10/2008 | Kim et al. | 345/651 |
| 2009/0007001 A1* | 1/2009 | Morin | G06F 3/0237 715/773 |
| 2009/0207184 A1* | 8/2009 | Laine et al. | 345/156 |
| 2010/0238109 A1* | 9/2010 | Cook et al. | 345/156 |

* cited by examiner

*Primary Examiner* — Andre L Matthews
(74) *Attorney, Agent, or Firm* — Merchant & Gould P.C.

(57) ABSTRACT

Different functional views for a mobile device are provided depending on orientation of the device. The mobile device includes an enclosure and a display disposed within the enclosure, wherein the display presents a functional view to a user when the device is positioned in a first orientation and a second functional view when the display is rotated to a second orientation.

21 Claims, 4 Drawing Sheets

SYSTEM, METHOD AND DEVICE FOR PRESENTING DIFFERENT FUNCTIONAL DISPLAYS WHEN ORIENTATION OF THE DEVICE CHANGES

FIELD OF THE INVENTION

This disclosure relates in general to a device and method for managing media by consumers, and more particularly to a system, method and device for presenting different functional displays when orientation of the device changes.

BACKGROUND

Mobile devices may be configured to run various media control applications. For example, programs may be used to present a program grid on the mobile device to control a DVR recording system. Other programs may be used to configure a mobile device to display a remote control interface on a display of the mobile device. However, separate applications are used to present the different user interfaces. Moreover, to switch between controlling a set-top box channel selection and displaying a program guide requires one program to be terminated and or for the user to somehow toggle or switch to the second application.

Mobile devices, such as smart phones, digital audio players, personal digital assistants, iPods, iPads, slate computers, etc., often include an accelerometer that enables the display to change when the orientation of the device is changed, e.g., rotated. For example, the accelerometer may be used to switch from a landscape view of a page to a portrait view of the same page. However, there is not a mobile device that uses an accelerometer to switch the look and functionality of the display of the mobile device to present a first type of functionality when the device is in a first orientation and to present a second type of functionality when the device is in a second orientation.

Accordingly, there is a need for a system, method and device for presenting different functional displays when orientation of the device changes.

SUMMARY OF THE INVENTION

To overcome the limitations described above, and to overcome other limitations that will become apparent upon reading and understanding the present specification; embodiments for a system, method and device for presenting different functional displays when orientation of the device changes are disclosed.

The above-described problems are solved by providing a product that improves the experience for the individual using a mobile device by switching between a first functional view and a second functional view based on the orientation of the device. For example, a mobile device may implement an embodiment for configuring a product to improve the TV viewing experience of an individual by enabling the user to switch between a remote control interface and TV program guide context mode by rotating the device.

An embodiment provides a mobile device providing guide and control depending on orientation. The mobile device includes an enclosure and a display disposed within the enclosure, wherein the display presents a functional view to a user when the device is positioned in a first orientation and a second functional view when the display is rotated to a second orientation.

In another embodiment, a mobile device for providing a control interface and a guide interface depending on orientation is provided. The mobile device includes memory for storing data, an interactive display for presenting visual information to a user, an accelerometer for detecting an orientation of the interactive display and a processor, coupled to the memory, interactive display and accelerometer, the processor receiving signals from the accelerometer indicating a detected orientation of the interactive display, the processor presenting a first functional view on the interactive display to a user when the interactive display is positioned in a first orientation and a second functional view when the interactive display is positioned in a second orientation.

In another embodiment, a method for changing between a control interface and a guide interface presented on a mobile device display depending on orientation of the device is provided. The method includes storing data in a memory, presenting visual information to a user on an interactive display, detecting an orientation of the interactive display using an accelerometer, receiving signals from the accelerometer indicating a detected orientation of the interactive display, presenting a first functional view on the interactive display to a user when the interactive display is positioned in a first orientation and presenting a second functional view when the interactive display is positioned in a second orientation.

In another embodiment, a computer readable medium including executable instructions which, when executed by a processor, changes between a control interface and a guide interface presented on a mobile device display depending on orientation of the device is provided. The computer readable medium includes instructions for storing data in a memory, presenting visual information to a user on an interactive display, detecting an orientation of the interactive display using an accelerometer, receiving signals from the accelerometer indicating a detected orientation of the interactive display, presenting a first functional view on the interactive display to a user when the interactive display is positioned in a first orientation and presenting a second functional view when the interactive display is positioned in a second orientation.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments are directed to mobile devices that switch between a first functional view and a second functional view based on the orientation of the mobile device. For example, a mobile device may implement an embodiment for configuring a product to improve the TV viewing experience of an individual by enabling the user to switch between a remote control interface and TV program guide context mode by rotating the device.

Figure 1:
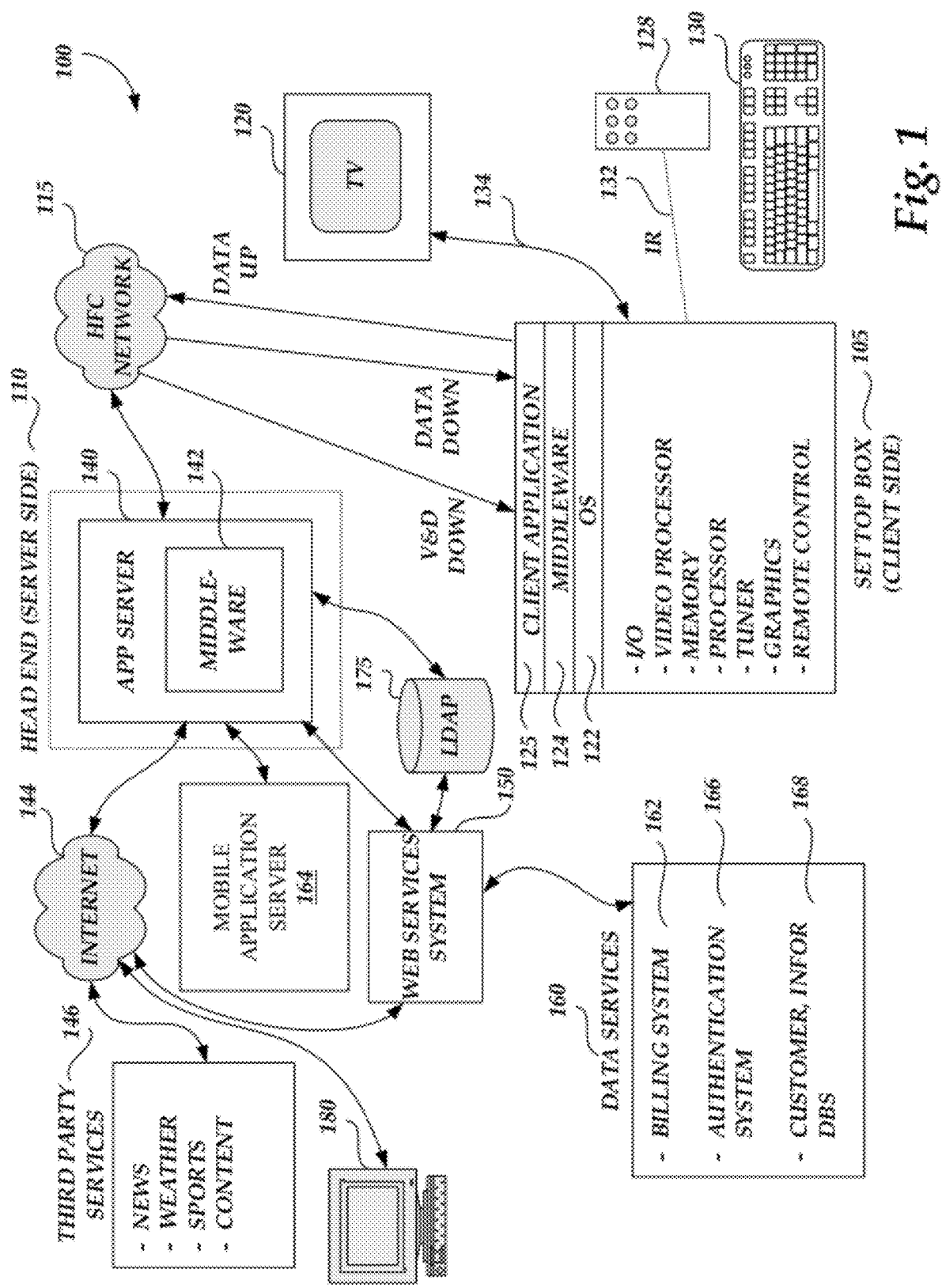
FIG. 1 is a simplified block diagram illustrating a cable television/services system architecture that serves as an exemplary operating environment.

FIG. 1 is a simplified block diagram illustrating a cable television/services system 100 (hereafter referred to as "CATV") architecture providing an operating environment according to an embodiment. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments, the functionality of the HFC network 115 allows for efficient bidirectional data flow between the client-side set-top box 105 and the server-side application server 140 of the embodiment.

According to embodiments, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modem CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory, and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The remote control device 128 may include a biometric input module 129. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment, the middleware layer 124 may include a set of application programming interfaces (APIs) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment, the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 144 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment, data obtained and managed by the middleware layer 142 of the application server 140 is formatted according to the Extensible Markup Language and is passed to the set-top box 105 through the HFC network 115 where the XML-formatted data may be utilized by a client application 125 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments, the billing system 162 may also include billing data for services and products subscribed to by the customer for bill processing billing presentment and payment receipt.

A customer information database 168 may include general information about customers such as place of employment, business address, business telephone number, and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

A cross-platform mobile application server 164 may contain information such as electronic mail addresses, high-speed Internet access subscription information, and electronic mail usage data. An authentication system 166 may include information such as secure user names and passwords utilized by customers for access to network services. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments, the web services system 150 serves as a collection point for data requested from each of the disparate data services systems comprising the data services 160. According to embodiments, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
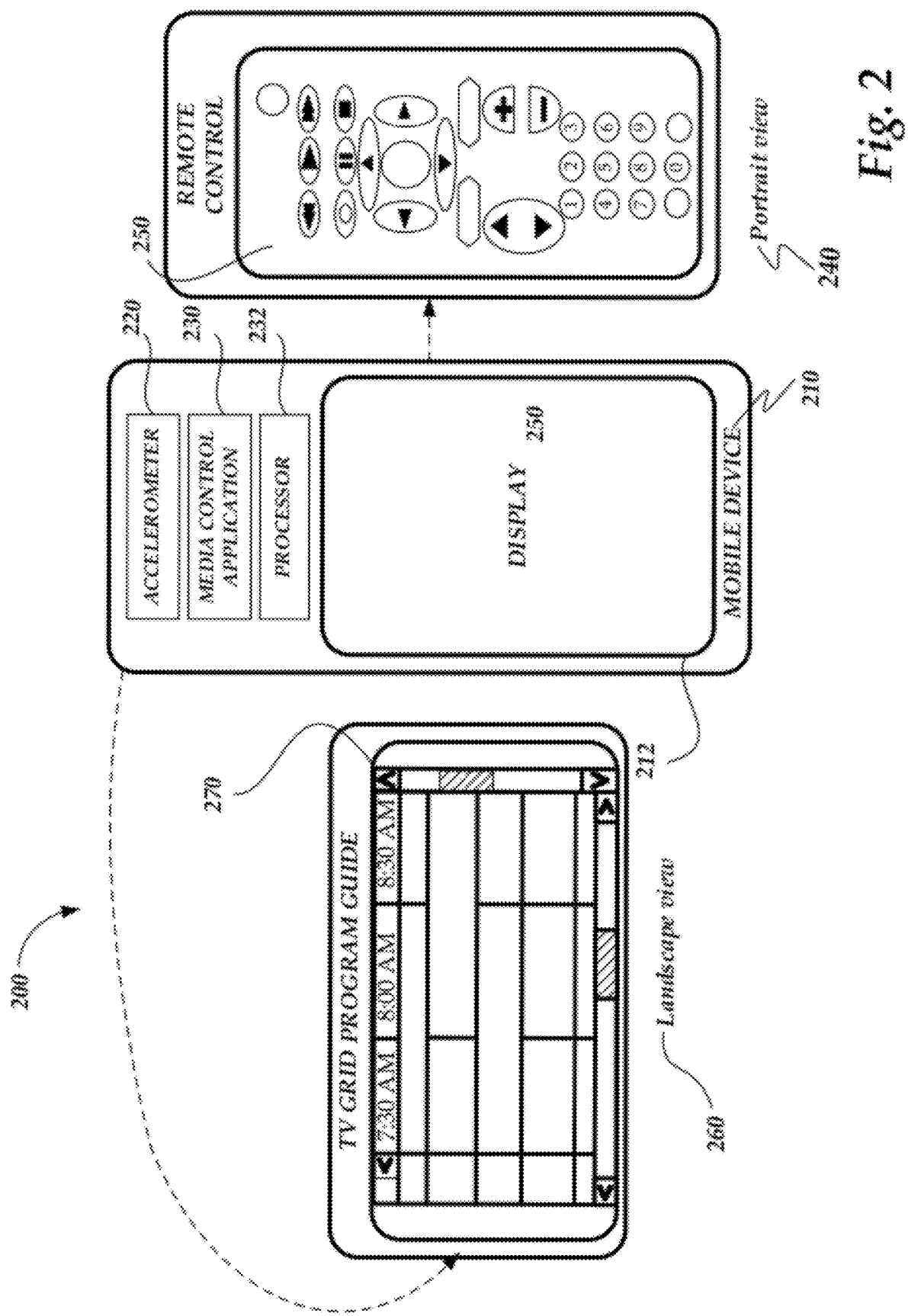
FIG. 2 illustrates a mobile device and the switching between two functional modes by changing directions of the mobile device according to one embodiment.

FIG. 2 illustrates a mobile device and the switching between two functional modes by changing directions of the mobile device 200 according to one embodiment. In FIG. 2, a mobile device 210 is shown having an accelerometer 220 and an application 230 controlled by a processor 232. Most mobile devices 210 now have built-in accelerometers 220 that are accessible by the running application.

An accelerometer 220 uses a sensing element and an interface to provide an indication of measured acceleration by converting mechanical motion into an electrical signal. These electrical signals may be processed to align a display screen depending on the direction the device is held, i.e. switching between portrait and landscape views of a screen display 212. Typically, two or three axes linear accelerometers 220 are implemented to provide two or three dimensional motion detection. Thus, accelerometer 220 provides a vector reflecting the direction of gravity.

The accelerometer 220 provides signals that are used to determine the orientation of the mobile devices 210. The mobile device 210 includes a display 212, such as an interactive screen. The display 212 presents a functional view to a user when the device is positioned in a first orientation and a second functional view when the display is rotated to a second orientation. The accelerometer 220 indicates whether the mobile device 210 is being held in a first orientation, e.g., vertically or in a portrait orientation, or in a second orientation, e.g., horizontally or in a landscape orientation. Thus, the accelerometer 220 provides the signals used to indicate an orientation for the device 210.

By using the accelerometer information, a mobile device 210 uses an application 230 to change context of the display 212, e.g., from an electronic remote control to a grid guide control. If the mobile device 210 is held upright or in a portrait orientation 240, the mobile device 210 displays characteristics of a remote control 250, allowing the user to change channels and to issue VCR-style fast forward/rewind/pause/play commands using the interactive display 212. In this mode, the device 210 may also be configured to resemble a remote control, e.g., the device may be taller than it is wide. If instead the mobile device 210 is held sideways, e.g., in landscape orientation 260, the display 212 of the mobile device presents a program guide 270, providing the ability to browse a grid of TV listings, and pan the show listings by time of channel.

The initial orientation of the mobile device 210 automatically determines which functionality is presented when the application first launches, without the user having to interact with a menu system or buttons to choose their desired mode of operation. The mobile device 210 can also be rotated at any time to switch between two functional views, e.g., a remote control interface and a TV guide grid.

The configurable use of rotation to expose access to the two functions also allows each application to make maximal use of the real estate afforded by the display 212. For example, the remote and grid modes may each utilize the entire screen, without need to reserve part of the touchscreen display for a "switch mode" button or for other navigation buttons.

While the terms portrait and landscape have been used to describe the orientation herein, those skilled in the art will recognize that the embodiments need not be limited to such constraints. The advantages and functions provided by the embodiments described herein are not dependent upon the shape of the display or the device. Rather, the detection of orientation allows a user to switch between functional views.

Figure 3:
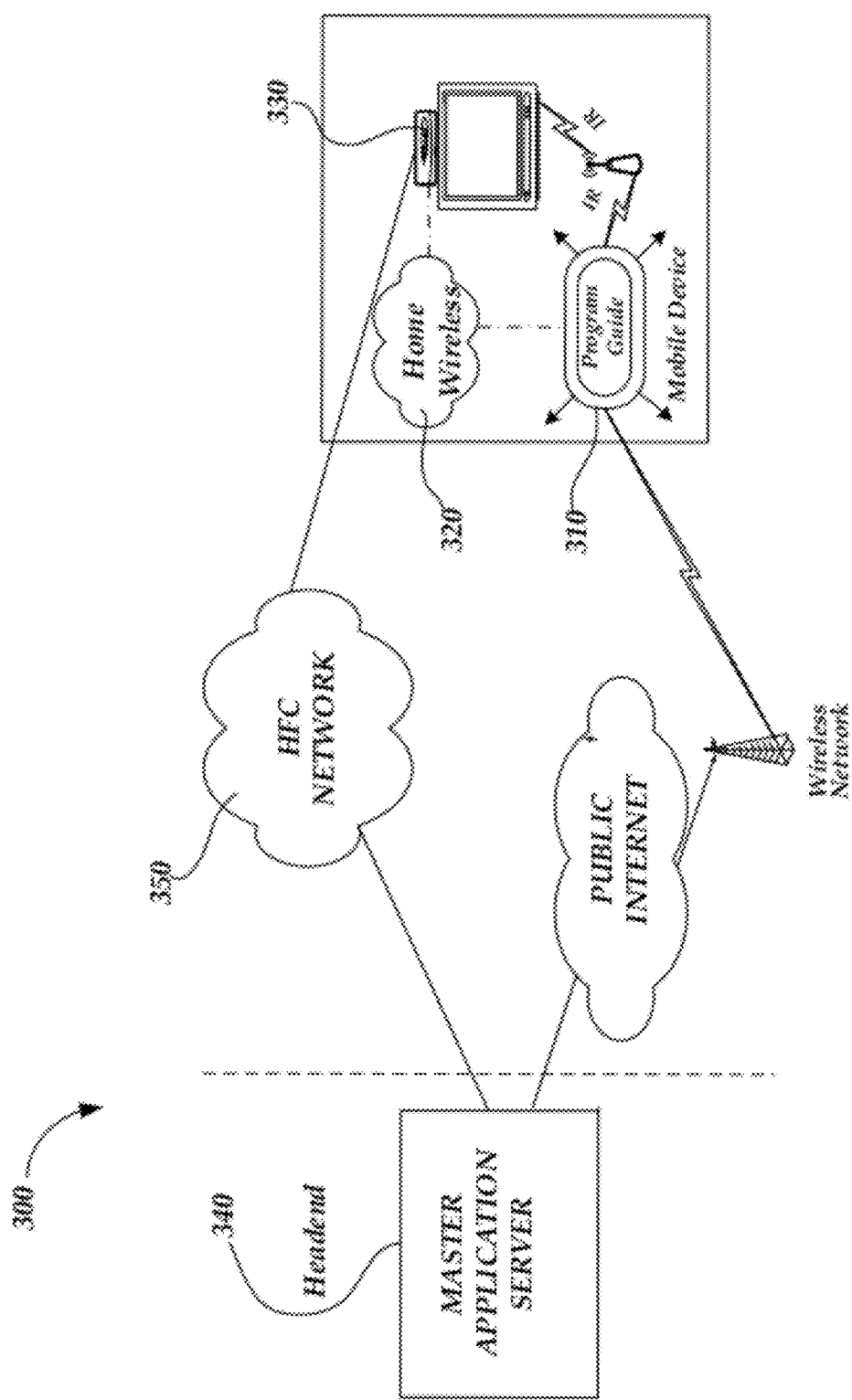
FIG. 3 illustrates a mobile device's interaction with a set top box to display and select features within a program guide according to one embodiment.

FIG. 3 illustrates a mobile device's interaction with a set top box (STB) to display and select features within a program guide 300 according to one embodiment. The mobile device may be used to select from the displayed program guide a program for recording or playback. The mobile device 310 communicates with the set-top box 330 and controls the selection of a channel from the program guide.

The remote control interface in the mobile device 310 may be configured to control any device. Another interface communicates with a program guide which is interactively displayed on the mobile device 310. The orientation of the mobile device 310 determines the type of interface presented to the user (see FIG. 2). A home wireless network 320 may be used to communicate directly between a mobile device 310 and a set-top box 330. The mobile device 310 also communicates with the master phone application server in the headend 340, and then the headend communicates information back to the set-top box 330 via the Hybrid Fiber Coax (HFC) network 350 infrastructure. The mobile device 310 may be used to control DVR settings. Limitations and rules for use of the application in the mobile device 310 may be programmed.

Figure 4:
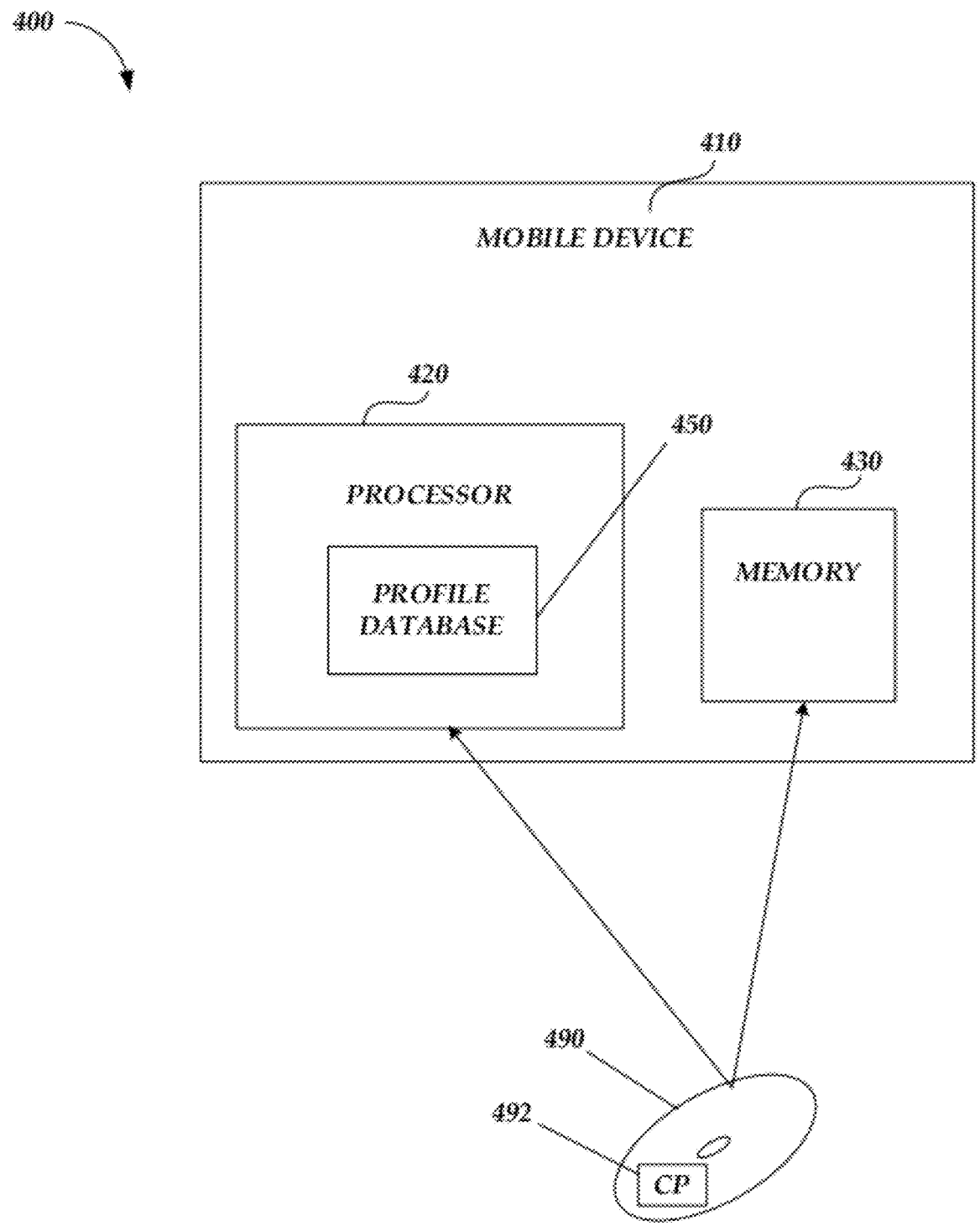
FIG. 4 illustrates a suitable computing environment for implementing a mobile device as described above in FIGS. 1-3 according to an embodiment.

FIG. 4 illustrates a suitable computing environment 400 for implementing a mobile device as described above in FIGS. 1-3 according to an embodiment. In FIG. 4, a mobile device 410 includes a processor 420 and memory 430. Those skilled in the art will recognize that the mobile device 410 may be implemented as a smart phone or another mobile device. Embodiments may also be implemented in combination with other types of computer systems and program modules. Generally, program modules include routines, programs, components, data structures, and other types of structures that perform particular tasks or implement particular abstract data types. By way of example, computer readable media 490 can include computer storage media or other tangible media. Computer storage media 490 includes volatile and nonvolatile, removable and non-removable media implemented in any method or technology for storage of information 492, such as computer readable instructions, data structures, program modules or other data. Moreover, those skilled in the art will appreciate that other computer system configurations may be implemented, including handheld devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 490 may refer to a mass storage device, such as a hard disk or CD-ROM drive. However, it should be appreciated by those skilled in the art that tangible computer-readable media can be any available media that can be accessed or utilized by a processing device, e.g., server or communications network provider infrastructure.

By way of example, and not limitation, computer-readable media 490 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 420 may be configured to execute instructions that perform the operations of embodiments.

It should also be appreciated that various embodiments can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of embodiments as recited within the claims set forth herein.

Memory 430 thus may store the computer-executable instructions that, when executed by processor 420, cause the processor 420 to implement a mobile device 410 according to an embodiment as described above with reference to FIGS. 1-3.

The foregoing description of the embodiments has been presented for the purposes of illustration and description. It is not intended to be exhaustive or to limit the embodiments to the precise form disclosed. Many modifications and variations are possible in light of the above teaching. It is intended that the scope of the embodiments be limited not with this detailed description, but rather by the claims appended hereto.

What is claimed is:

1. A mobile device providing guide and control depending on orientation, comprising:
an enclosure; and
an interactive display disposed on the enclosure, wherein the interactive display presents a first functional view of a first application to a user in response to orienting the mobile device into a first orientation and a second functional view of a second application that is different from the first functional view in response to orienting the mobile device out of the first orientation into a second orientation, the second functional view of the second application presenting a guide view comprising a TV grid program guide for viewing offerings of media programs, the viewing offerings of the media programs being selectable to record the media programs, the first functional view of the first application presenting a remote control interface on the interactive display for controlling the media programs presented in the TV grid program guide of the second functional view, wherein orienting the mobile device between the first and second orientations switches between the remote control interface of the first application and the TV grid program guide of the second application, and wherein an initial orientation of the mobile device automatically determines whether to first present the first functional view of the first application or the second functional view of the second application without manual user interaction with the interactive display.

2. The mobile device of claim 1, wherein the guide view comprises a TV grid program guide presenting programs according to times and access parameters.

3. The mobile device of claim 1, wherein the second first functional view presents a control interface comprising an interactive display for controlling a media device.

4. The mobile device of claim 3, wherein the interactive display for controlling the media device comprises a remote control interface for controlling a television.

5. The mobile device of claim 1, wherein the interactive display presents the second functional view comprising the guide view to the user when the mobile device is positioned in a landscape orientation and presents the first functional view comprising a control interface when the interactive display is positioned in a portrait orientation.

6. The mobile device of claim 1, wherein the initial orientation of the mobile device is determined to be the first orientation and the first functional view is presented.

7. The mobile device of claim 1, wherein in response to determining the initial orientation, one of either the first functionality and the second functionality is presented on the display based on which makes maximal use of the display based on the initial orientation.

8. A mobile device for providing a control interface and a guide interface depending on orientation, comprising:
memory for storing data;
an interactive display for presenting visual information to a user;
an accelerometer for detecting an orientation of the interactive display; and
a processor, coupled to the memory, interactive display and the accelerometer, the processor receiving signals from the accelerometer indicating a detected orientation of the interactive display, the processor presenting a first functional view of a first application on the interactive display to the user in response to orienting the mobile device into a first orientation and a second functional view of a second application that is different from the first functional view in response to orienting the mobile device out of the first orientation into a second orientation, the first functional view of the first application comprising a remote control interface on the interactive display for controlling a media program from a program guide of the second functional view, and the second functional view displaying media programs selectable for recording and playback, wherein orienting the mobile device between the first and second orientations switches between the remote control interface of the first application and a TV grid program guide of the second application, and wherein an initial orientation of the mobile device automatically determines whether to first present the first functional view of the first application or the second functional view of the second application without manual user interaction with the interactive display.

9. The mobile device of claim 8, wherein the TV grid program guide presenting programs according to times and access parameters.

10. The mobile device of claim 8, wherein the interactive display presents the second functional view comprising a guide view to the user when the mobile device is positioned in a landscape orientation and presents the first functional view comprising a control interface when the interactive display is positioned in a portrait orientation.

11. The mobile device of claim 8, wherein the second functional view presenting a guide view comprising a TV grid program guide for viewing offerings of media programs, the viewing offerings of the media programs being selectable to record the media programs.

12. A method for changing between a control interface and a guide interface presented on a mobile device display depending on orientation of the mobile device, comprising:
storing data in a memory;
presenting visual information to a user on an interactive display;
detecting an orientation of the interactive display using an accelerometer;
receiving signals from the accelerometer indicating a detected orientation of the interactive display;
presenting a second functional view of a second application on the interactive display to the user in response to orienting the mobile device into a second orientation, the second functional view presenting a guide view comprising a TV grid program guide for viewing offerings of media programs, the second functional view allowing the user to browse the TV grid program guide and pan the viewing offerings by time, the viewing offerings of the media programs being selectable to record the media programs; and
presenting a first functional view of a first application that is different from the second functional view in response to orienting the mobile device out of the second orientation into a first orientation, the first functional view of the first application presenting a remote control interface on the interactive display for controlling the media programs presented in the second functional view, wherein orienting the mobile device between the first and second orientations switches between the remote control interface of the first application and the TV grid program guide of the second application, and wherein an initial orientation of the mobile device automatically determines whether to first present the first functional view of the first application or the second functional view of the second application without manual user interaction with the interactive display.

13. The method of claim 12, wherein the presenting the second functional view on the interactive display further comprises presenting the guide view on the interactive display including the TV grid program guide for viewing offerings of the media programs.

14. The method of claim 13, wherein the presenting the guide view on the interactive display further comprises presenting a TV grid program guide presenting programs according to times and access parameters.

15. The method of claim 12, wherein the presenting the first functional view on the interactive display further comprises presenting a control interface on the interactive display for controlling a media device.

16. The method of claim 12, wherein the presenting a control interface on the interactive display further comprises presenting a remote control interface for controlling a television.

17. The method of claim 12, wherein the presenting the second functional view on the interactive display further comprises presenting the guide view on the interactive display to the user when the interactive display is positioned in a landscape orientation and wherein the presenting the first functional view on the interactive display further comprises presenting a control interface when the interactive display is positioned in a portrait orientation.

18. A non-transitory computer readable storage device including executable instructions which, when executed by a processor, changes between a control interface and a guide interface presented on a mobile device display depending on orientation of the mobile device, by:
    storing data in a memory;
    presenting visual information to a user on an interactive display;
    detecting an orientation of the interactive display using an accelerometer;
    receiving signals from the accelerometer indicating a detected orientation of the interactive display;
    presenting a second functional view of a second application on the interactive display to the user in response to orienting the mobile device into a second orientation; and
    in response to orienting the mobile device out of the second orientation, presenting a first functional view of a first application that is different from the second functional view, the first functional view of the first application comprising a remote control interface on the interactive display for presenting DVR controls for recording and playback for one or more media devices, and the second functional view displaying media programs selectable for recording and playback at the one or more media devices, wherein orienting the mobile device between the first and second orientations switches between a program guide of the second application and the DVR controls of the first application, and wherein an initial orientation of the mobile device automatically determines whether to first present the first functional view of the first application or the second functional view of the second application without manual user interaction with the interactive display.

19. The non-transitory computer readable medium of claim 18, wherein the presenting the second functional view on the interactive display further comprises presenting a guide view on the interactive display to the user when the interactive display is positioned in a landscape orientation and wherein the presenting the first functional view on the interactive display further comprises presenting a control interface when the interactive display is positioned in a portrait orientation.

20. The non-transitory computer readable medium of claim 18, wherein the second functional view presenting a guide view comprising a TV grid program guide for viewing offerings of media programs.

21. The non-transitory computer readable medium of claim 20, wherein the second functional view presenting the guide view comprising the TV grid program guide for viewing offerings of the media programs, the viewing offerings of the media programs being selectable to record the media programs.

* * * * *